Patented Mar. 11, 1930

1,749,823

UNITED STATES PATENT OFFICE

BERNARD LONG, OF PARIS, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE

GLASS AND METHOD OF PRODUCING IT

No Drawing. Application filed June 14, 1928, Serial No. 285,503, and in France July 2, 1927.

I have discovered that in a glass resulting from the cooling of a melted mixture containing phosphoric acid, or phosphoric and boric acids, and salts of the alkaline earths, or alumina (as distinguished from a silicate glass) titanium dioxide gives the glass, when it has been properly melted, a very pure violet color. The transmission of such a glass is such that when a layer of it is associated, as in a doublet, with a layer of silica glass having the usual green tint (due to oxide of iron contained therein) a screen is produced having nearly uniform transmission for the whole of the visible spectrum, and of a neutral grey tint.

In making my new glass I melt a batch containing phosphoric acid, or phosphoric and boric acids, and salts of the alkaline earths, or alumina, together with a small percentage (say one or two per cent) of titanium dioxide. The color of the resultant glass is generally purer the higher the melting temperature and when the melting has taken place under reducing conditions, such as results from the introduction of carbonaceous materials (carbon, sugar, etc.) into the batch.

If desired, small percentages of alkalis may be also introduced into the batch.

The following are examples of the percentage compositions of glasses made by me and embodying my invention:

|  | 1 | 2 |
|---|---|---|
| $P_2O_5$ | 72.50 | 67.00 |
| $CaO$ | 22.40 | |
| $MgO$ | 3.10 | 12.30 |
| $B_2O_3$ | | 10.60 |
| $Al_2O_3$ | | 8.50 |
| $TiO_2$ | 2.00 | 1.60 |

The following are suitable batches for the above glasses:—

|  | 1 | 2 |
|---|---|---|
| Phosphoric acid (60° Baumé) | 76.1 | 59.4 |
| Boric acid | | 18.7 |
| Di-calcium phosphate ($CaHPO_4$) (49% CaO) | 45.7 | |
| Magnesium phosphate, hydrated ($Mg_3(PO_4)_2.7H_2O$) (losing 36% on ignition) | 11.4 | 45.5 |
| Aluminium phosphate ($AlPO_4$) hydrated, (losing 27.2% on ignition) | | 30.1 |
| Titanium oxide | 2.0 | 1.6 |

To the above are added a sufficient quantity of the carbonaceous reducing agent, effective to cause the melting to take place under reducing conditions.

Both of the glasses above disclosed are resistant to moisture.

Having thus described my invention what I claim is:—

1. A violet-colored phosphate glass containing a relatively small percentage of titanium dioxide and being substantially free from silica.

2. A violet-colored phosphate glass containing boric oxide, a relatively small percentage of titanium dioxide, and being substantially free from silica.

3. The method of making a violet colored glass which comprises melting a batch substantially free from silica and containing metallic phosphates and titanium dioxide, under reducing conditions.

4. The method of making a violet colored glass which comprises melting a batch substantially free from silica and containing metallic phosphates, boric acid and titanium dioxide, under reducing conditions.

In testimony whereof I hereunto affix my signature.

BERNARD LONG.